United States Patent
Kappel et al.

(10) Patent No.: US 10,231,389 B2
(45) Date of Patent: Mar. 19, 2019

(54) STUMP CUTTER

(71) Applicant: Vermeer Manufacturing Company, Pella, IA (US)

(72) Inventors: Gary W. Kappel, Pella, IA (US); Christopher A. Pfoltner, Knoxville, IA (US); Brent A. Bartels, Pella, IA (US); Mark A. Rieckhoff, Waconia, MN (US)

(73) Assignee: VERMEER MANUFACTURING COMPANY, Pella, IA (US)

( * ) Notice: Subject to any disclaimer, the term of this patent is extended or adjusted under 35 U.S.C. 154(b) by 774 days.

(21) Appl. No.: 14/299,853

(22) Filed: Jun. 9, 2014

(65) Prior Publication Data

US 2014/0283950 A1    Sep. 25, 2014

Related U.S. Application Data

(63) Continuation of application No. 12/741,807, filed as application No. PCT/US2008/082322 on Nov. 4, 2008, now Pat. No. 8,783,308.

(60) Provisional application No. 61/002,092, filed on Nov. 6, 2007.

(51) Int. Cl.
*A01G 23/06* (2006.01)

(52) U.S. Cl.
CPC .................. *A01G 23/067* (2013.01)

(58) Field of Classification Search
CPC ........... A01G 23/00; A01G 23/06; B27B 1/00
USPC .......................... 144/24.12, 334; 241/101.72
See application file for complete search history.

(56) References Cited

U.S. PATENT DOCUMENTS

| | | | |
|---|---|---|---|
| 3,198,224 A * | 8/1965 | Hiley | A01G 23/067 144/24.12 |
| 3,243,905 A | 4/1966 | Ulrich | |
| 3,275,172 A | 9/1966 | Smith | |
| 3,307,643 A * | 3/1967 | Ferri | A01G 23/067 175/161 |

(Continued)

FOREIGN PATENT DOCUMENTS

| | | |
|---|---|---|
| DE | 101 27 125 A1 | 12/2002 |
| FR | 2 691 606 A1 | 12/1993 |

OTHER PUBLICATIONS

Brochure for Vermeer Stump Cutter Model No. SC 372 including drawing of boom; prior art as of Nov. 6, 2007.

(Continued)

*Primary Examiner* — Shelley Self
*Assistant Examiner* — Smith O Bapthelus
(74) *Attorney, Agent, or Firm* — Merchant & Gould P.C.

(57) ABSTRACT

The present disclosure provides a device and method that enable the efficient reduction of stumps. In one embodiment the stump removal methods and devices according to the present disclosure allow the operator to have a clear view of the work area during operation, and the ability to move the reduction device through a wide range of motion during operation. In one embodiment, the material reduction tool pivots relative to the chassis in the vertical plane about multiple pivot points. In some embodiments the device includes a retractable auxiliary control panel located at the end of the device opposite the material reduction tool. The control panel enables the operator to direct the movement of the device from the end of the device and thereby enable the device to maneuver through narrow spaces.

19 Claims, 24 Drawing Sheets

(56) References Cited

U.S. PATENT DOCUMENTS

| | | | |
|---|---|---|---|
| 4,031,964 A * | 6/1977 | Takahashi | A01B 63/112 172/12 |
| 4,355,475 A * | 10/1982 | Harkness | A01G 23/06 172/448 |
| 5,109,895 A | 5/1992 | Rassier | |
| 5,513,486 A * | 5/1996 | Le Maigat | A01D 42/005 56/503 |
| 5,655,581 A | 8/1997 | Craft | |
| 5,718,271 A | 2/1998 | Engelhoven | |
| 5,794,673 A | 8/1998 | Milbourn et al. | |
| 5,845,689 A * | 12/1998 | Egging | A01G 23/067 144/334 |
| 5,921,302 A | 7/1999 | Petersen | |
| 6,014,996 A | 1/2000 | Egging et al. | |
| 6,026,871 A * | 2/2000 | Chapman | A01G 23/067 144/24.12 |
| 6,047,749 A | 4/2000 | Lamb | |
| 6,230,770 B1 | 5/2001 | Spaargaren | |
| 6,305,445 B1 | 10/2001 | Falatok | |
| 7,011,124 B1 | 4/2006 | Morey | |
| 8,783,308 B2 | 7/2014 | Kappel et al. | |
| 2004/0211097 A1 | 10/2004 | Paumier | |
| 2006/0096664 A1 | 5/2006 | Dubbs et al. | |
| 2007/0034288 A1 | 2/2007 | Monyak et al. | |
| 2007/0034294 A1* | 2/2007 | Chapman | A01G 23/067 144/334 |
| 2009/0101234 A1 | 4/2009 | Hart | |

OTHER PUBLICATIONS

Brochure for Vermeer Stump Cutter Model No. SC 60 TX including drawing of boom; prior art as of Nov. 6, 2007.

* cited by examiner

STUMP CUTTER

CROSS-REFERENCE TO RELATED APPLICATIONS

This application is a continuation of application Ser. No. 12/741,807, filed Sep. 1, 2010, which is a National Stage Application of PCT/US2008/082322, filed Nov. 4, 2008, which claims benefit to provisional patent application Ser. No. 61/020,92, filed on Nov. 6, 2007, titled Stump Cutter Boom, the disclosures of which are incorporate by reference herein in their entirety.

TECHNICAL FIELD

The present disclosure relates to material reduction machines and methods of using the machines and manufacturing the machines. In particular, the methods and machines according to the present disclosure are adapted to be used to remove tree stumps.

BACKGROUND

Various methods and machines for removing stumps are known. Generally, the stump reduction devices and associated methods can be divided into two types: those where the engine is mounted to the frame of the device and those where the engine is mounted to the articulating arm, which supports the cutting or grinding tool. The engine remains at a constant angle relative to the ground during operation in the first type of machine, whereas the engine operating angle changes during operation in the second type of machine. Though the first type of machines provide an inherently compact layout, there are associated disadvantages relating to the second type of machines (e.g., possible engine failure due to excessive tilting and a higher than desired center of gravity).

Examples of the first type of stump reduction machine are disclosed in U.S. Pat. No. 6,014,996, titled Control System for Stump Cutters assigned to Vermeer; and U.S. Pat. No. 7,011,124, titled Stump Grinder Having Automatic Reversing Feed Assembly assigned to Tramor. For example, of the second type of stump reduction machine see U.S. Pat. No. 6,026,781, titled Stump Cutter Safety System assigned to Rayco; and U.S. Pat. No. 6,230,770, titled Stump Chipper and Method for the Operation Thereof assigned to Vermeer-Holland. The present disclosure generally relates to the first type of stump reduction devices and related methods.

SUMMARY

The present disclosure provides a device and method that enable the efficient reduction of stumps. In one embodiment the stump removal methods and devices according to the present disclosure allow the operator to have a clear view of the work area during operation, and the ability to move the reduction device through a wide range of motion during operation. In one embodiment, the material reduction tool pivots relative to the chassis in the vertical plane about multiple pivot points.

In some embodiments the device includes a retractable auxiliary control panel located at the end of the device opposite the material reduction tool. The control panel enables the operator to direct the movement of the device from the end of the device and thereby enable the device to maneuver through narrow spaces.

BRIEF DESCRIPTION OF THE DRAWINGS

FIG. 1b is a back right perspective view of a stump reducing machine of FIG. 1a;

FIG. 1c is a back left perspective view of a stump reducing machine of FIG. 1a;

FIG. 1d is a front right perspective view of a stump reducing machine of FIG. 1a;

FIG. 3 is a perspective view of a portion of the stump reducing machine of FIG. 1a;

FIG. 16 is an exploded assembly view of the components of the auxiliary controls of FIG. 1a;

DETAILED DESCRIPTION

The stump reduction device according to the present disclosure is any device that is configured to cut, chip, or grind a tree stump. The stump reduction device is referred to herein interchangeably as a stump grinder, stump cutter, or stump chipper.

Figure 1A:
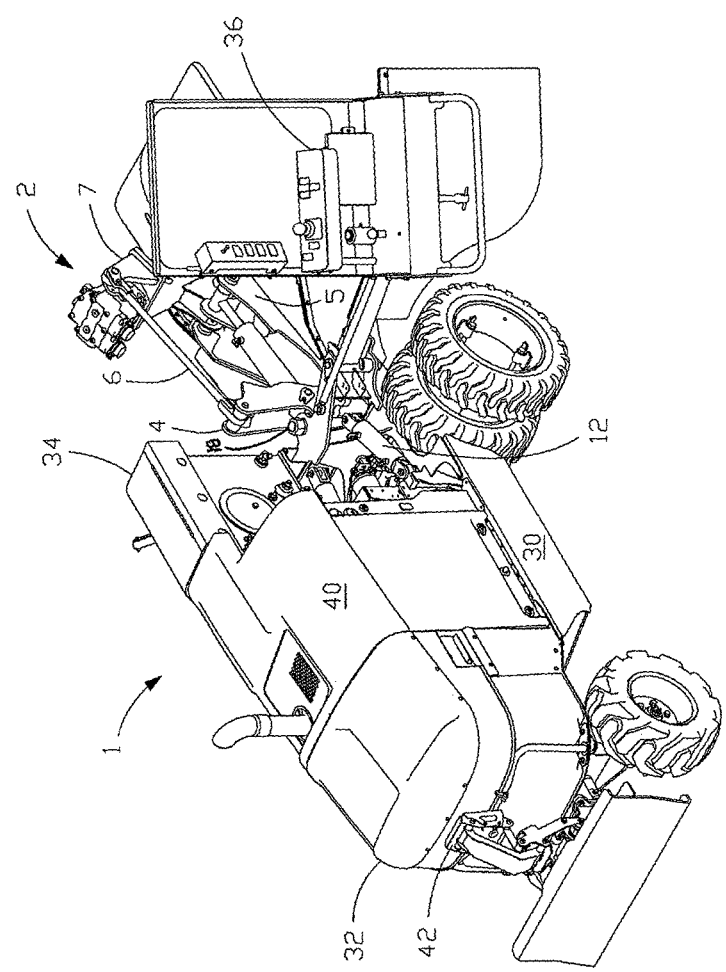
FIG. 1a is a front left perspective view of a stump reducing machine according to an embodiment of the present disclosure.
Figure 1B:
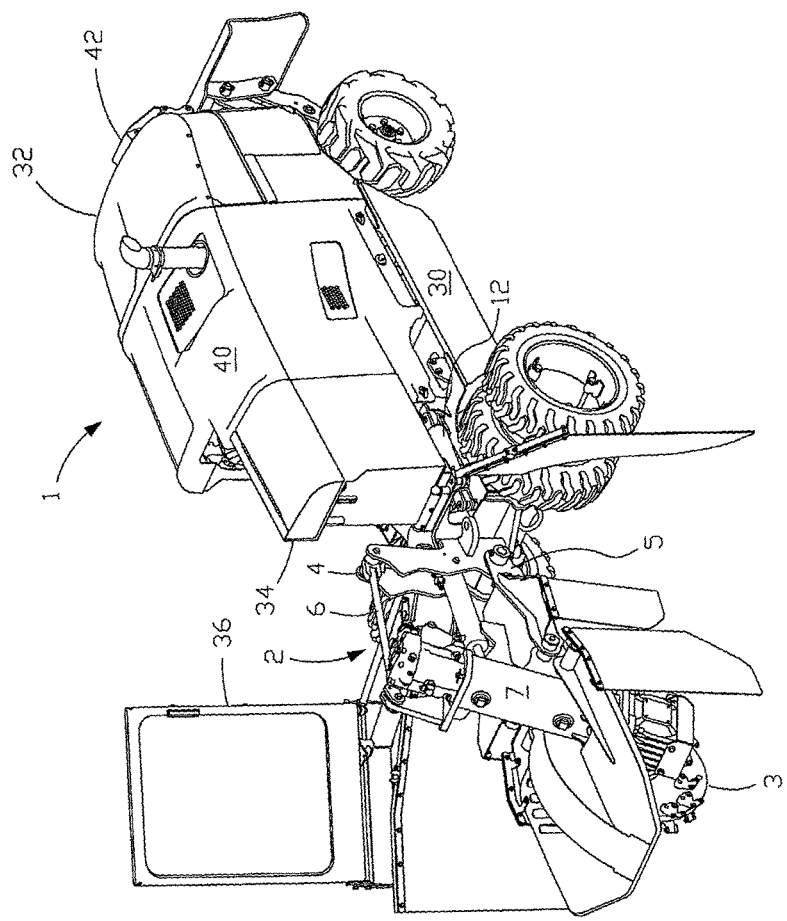
Figure 1C:
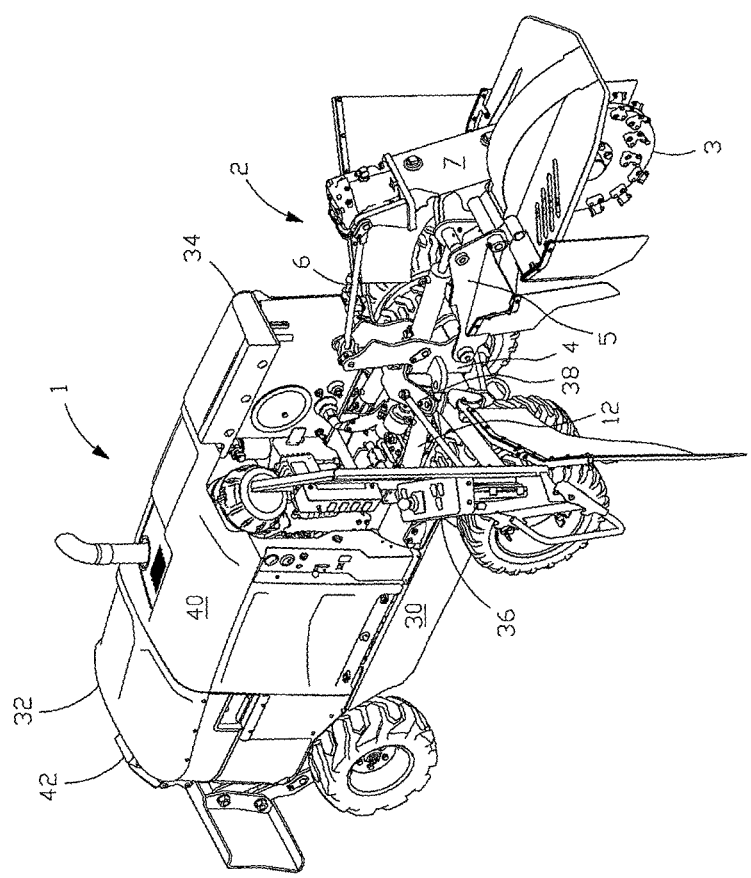
Figure 1D:
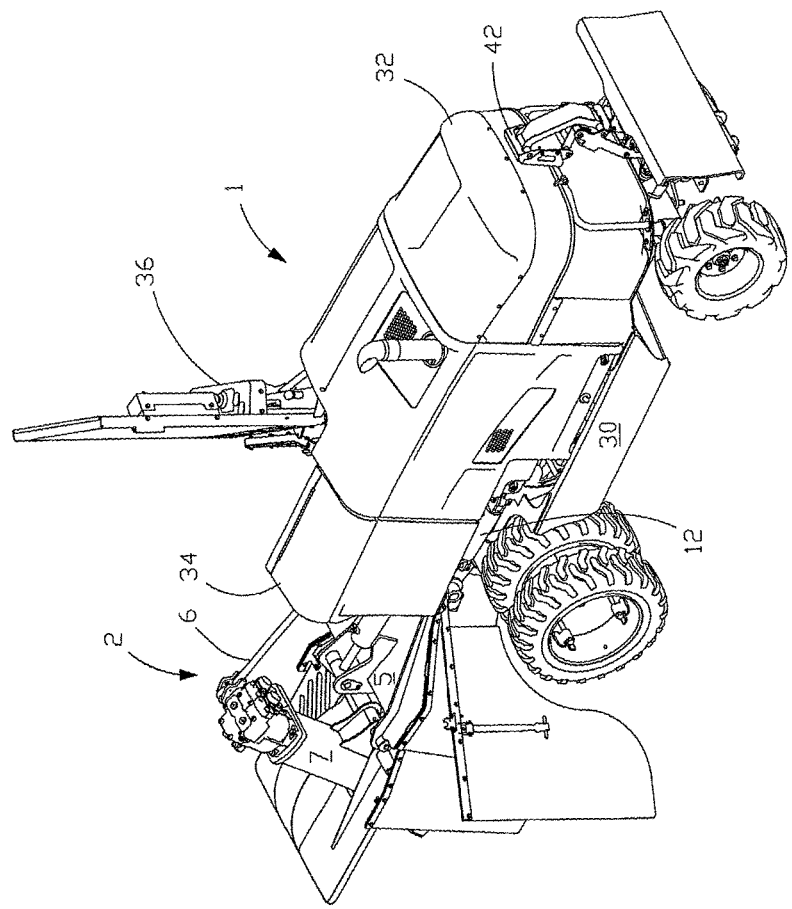
Figure 2A:
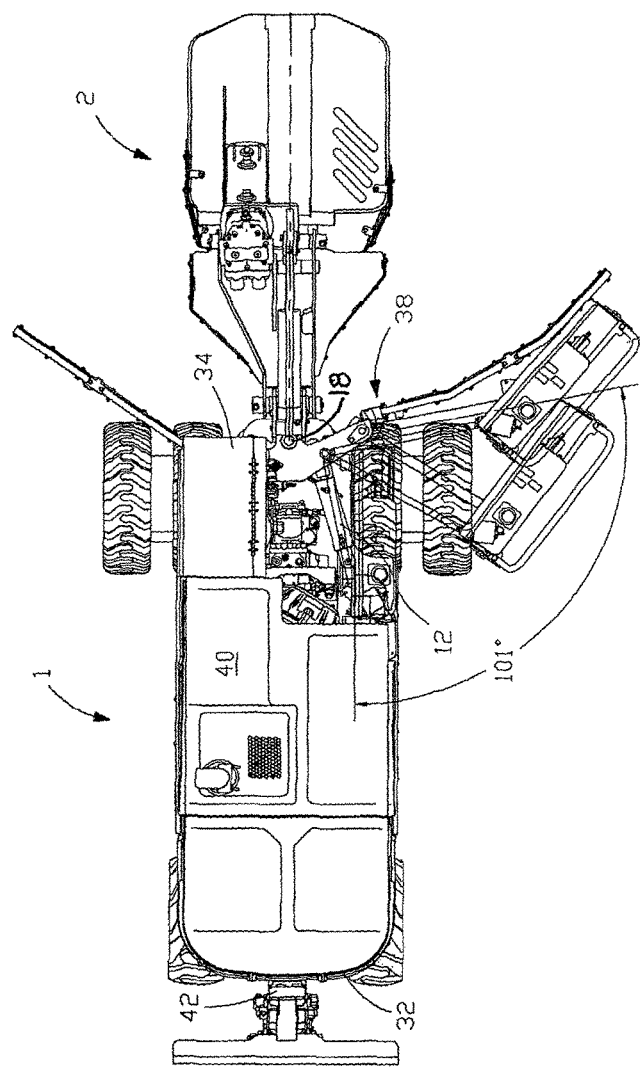
FIG. 2a is a top view of the stump reducing machine of FIG. 1a showing the path of the console.
Figure 2B:
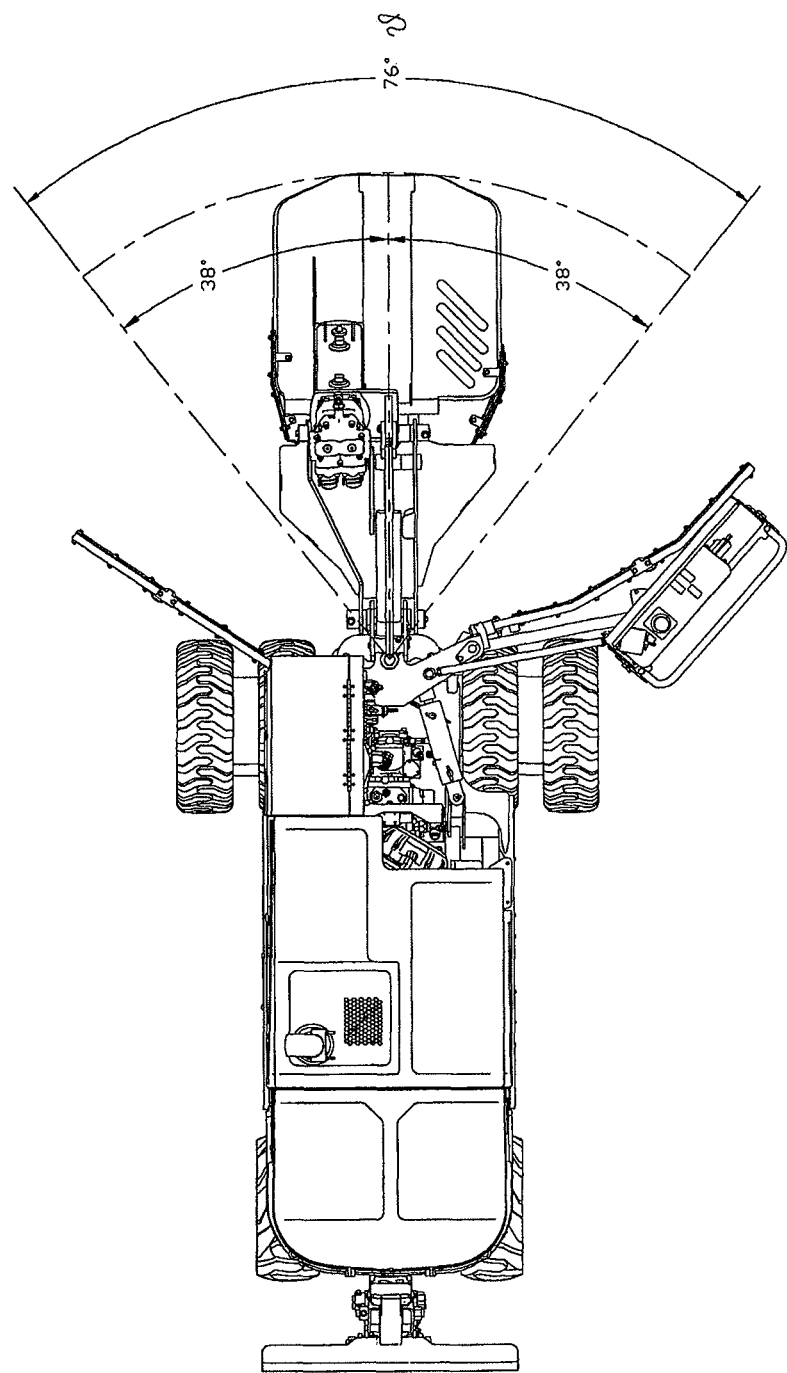
FIG. 2b is a top view of the stump reducing machine of FIG. 1a showing the path of the stump reduction tool.
Figure 3:
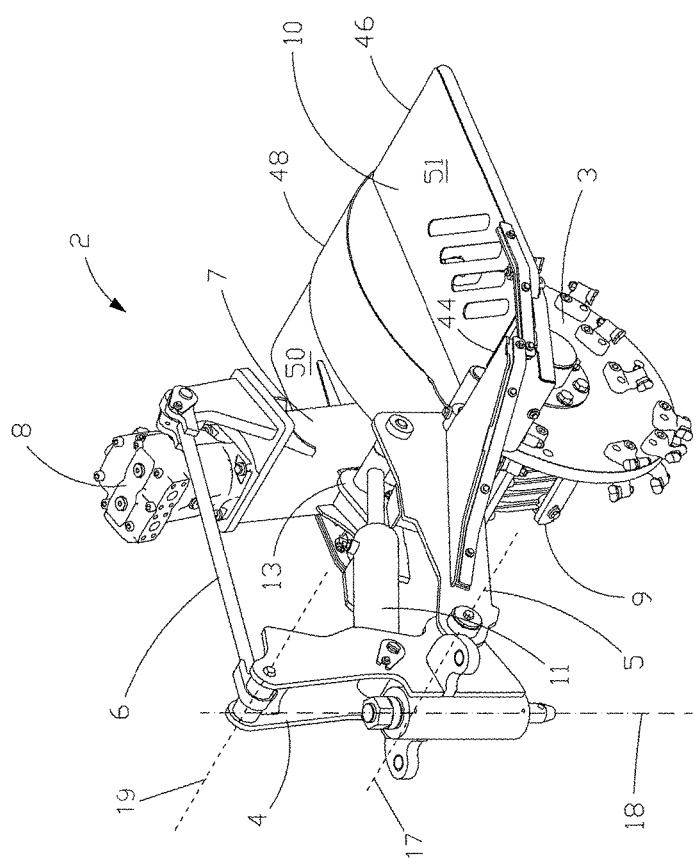

Referring to FIGS. 1a-d and 2a-b, an embodiment of a stump reduction device 1 is shown. The stump reduction device 1 includes a chassis 30 with a first end 32 and a second end 34. In the depicted embodiment, the stump reduction device 1 includes an engine 40 that is mounted between the first end 32 of the chassis 30 and the second end of the chassis 30. The engine 40 is mounted to the chassis 30 rather than to a moving arm. The stump reduction device 1 also includes a control console 36 mounted to the chassis 30 such that it can be positioned adjacent the second end 34 of the chassis 30. In the depicted embodiment, the control console 36 is pivotally attached to the chassis 30 via a linkage assembly 38 (FIGS. 1c and 2a). In addition, a secondary set of controls 42 is located near the first end 32 of the chassis 30, which enables an operator to control the machine while standing at the first end 32 of the machine. The stump reduction device 1 includes a mount member 4 pivotally connected to the second end of the chassis 30, and a material reduction linkage assembly 2 connected to the mount member 4. In the depicted embodiment, the mount member 4 and sweep cylinders 12 enable the material reduction linkage to pivot relative to the chassis 30 about a vertical axis 18 through a sweep range θ. In the depicted embodiment the sweep range is between 60 and 90 degrees and is independent of the vertical position of the material reduction linkage assembly 2. It should be appreciated that other sweep ranges are also possible.

Referring to FIGS. 3-8, the components of a first embodiment of the material reduction linkage assembly 2 are identified and described in greater detail. In the depicted embodiment the material reduction linkage assembly 2 includes a first linkage 6 and a second linkage 5, each pivotally connected to the mount member 4. Each of the first linkage 6 and the second linkage 5 is also pivotally connected to a third linkage 7. In the depicted embodiment, the first linkage 6 is shown as a rigid bar. In the depicted embodiment the third linkage 7 includes an upper end and a lower end. The lower end supports a gearbox, which supports a material reduction tool 3, shown as a cutter wheel, and the upper end supports a hydraulic motor 8 that drives the rotation of the material reduction tool 3 via a gear box assembly 9. A drive shaft within the third linkage 7 connects the gear box assembly 9 with the motor 8.

Still referring to FIGS. 3-8, the material reduction linkage assembly 2 further includes a lift cylinder 11 connected between the mount member 4 and the second linkage 5. The lift cylinder 11 can be a hydraulic cylinder arranged to raise and lower the assembly. The depicted embodiment further includes a guard 10 movably supported over the material reduction tool 3. The guard 10 is shown as a plate member including a trailing edge 44 and a leading edge 46. In the depicted embodiment, the guard 10 is pivotally mounted to the portion of the third linkage 7 referred to herein as the gusset 13. In the depicted embodiment, the guard plate includes a raised middle section 48 and lower outwardly extending side flanges 50, 51. It should be appreciated that many other alternative embodiments are possible. For example, some embodiments may include more linkages, other embodiments may include fewer linkages, and yet other embodiments may include differently arranged or configured linkages and guards.

Figure 4:
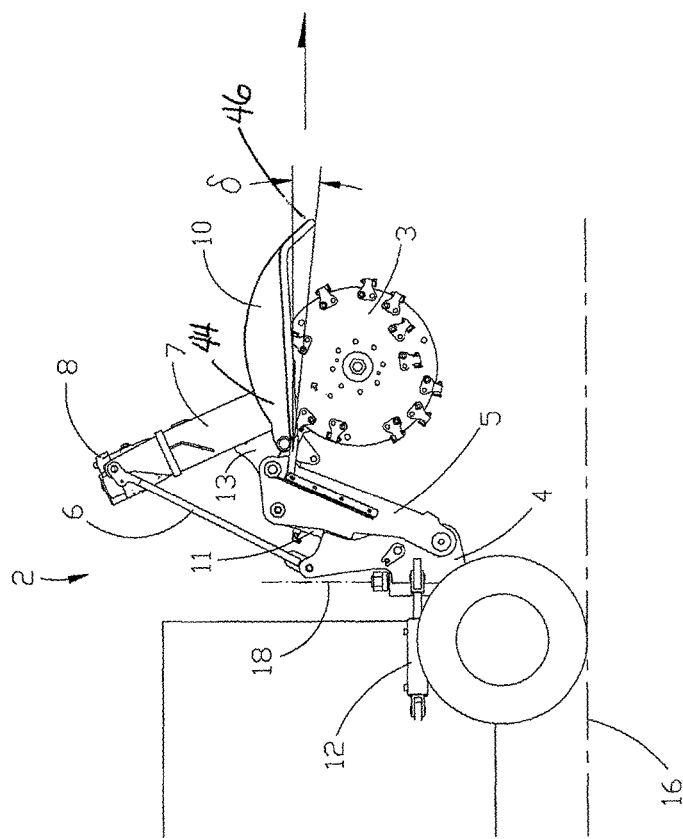
FIG. 4 is a left side schematic view of the stump reducing machine of FIG. 1a with the boom in the fully retracted position.
Figure 5:
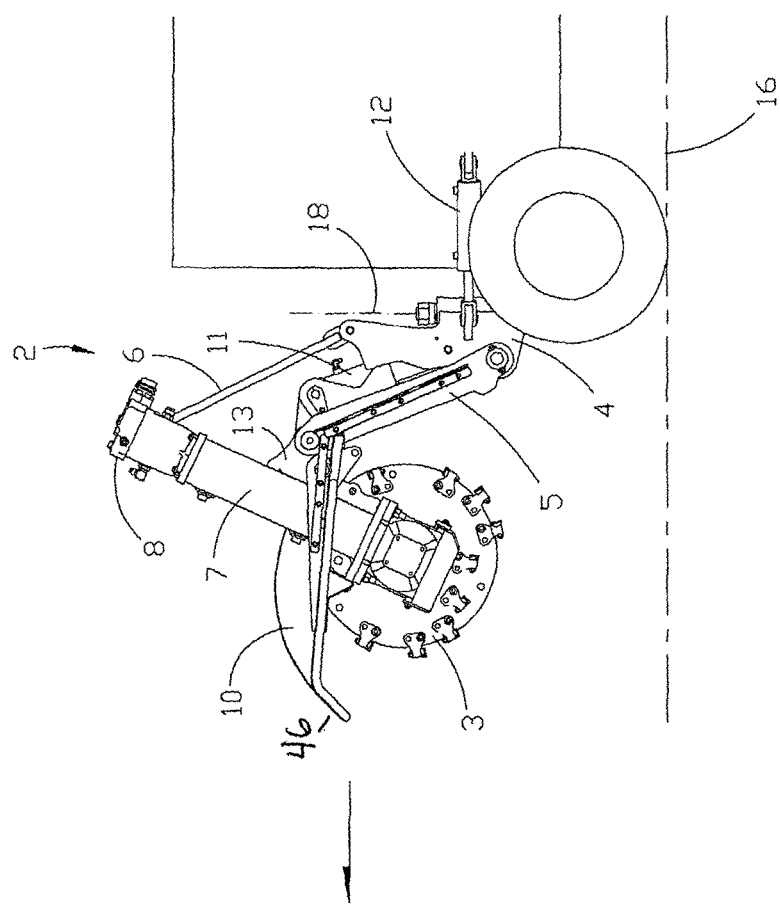
FIG. 5 is a right side schematic view of the stump reducing machine of FIG. 1 with the boom in the fully retracted position.
Figure 6:
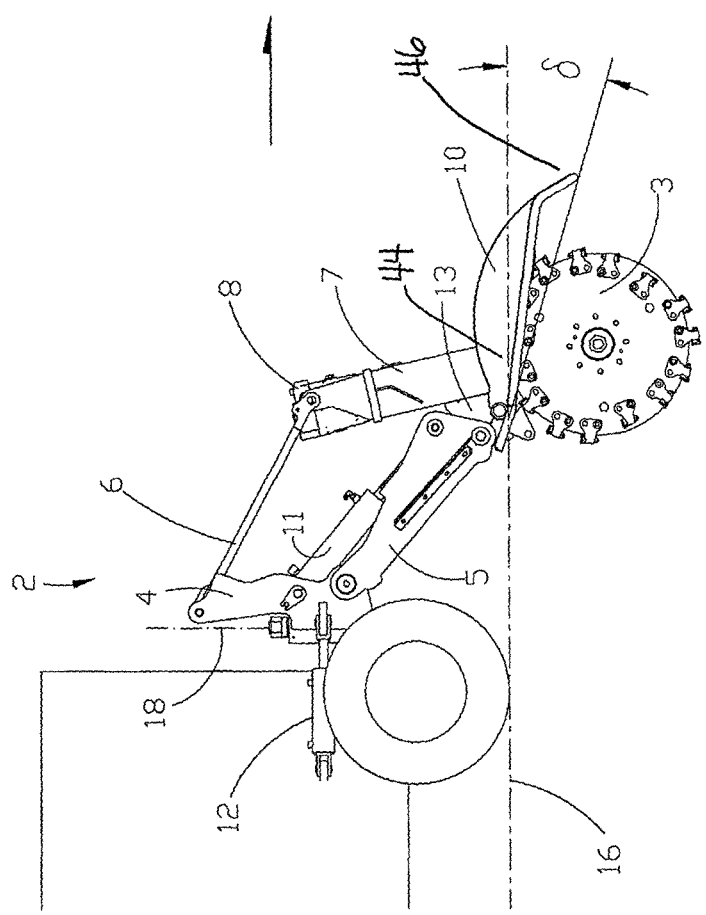
FIG. 6 is a left side view of the machine as in FIG. 1, showing the boom lift cylinder in the fully extended position.

Referring to FIGS. 4-8, the operation of the material reduction linkage assembly 2 is described in greater detail. FIGS. 4 and 5 depict the left and right sides of the material reduction linkage assembly 2 fully raised in an up most position, FIG. 6 depicts the left side of the material reduction linkage assembly 2 fully lowered in a down most position, and FIG. 7a depicts the left side of the material reduction linkage 2 in an intermediate position. In the depicted embodiment the up most position corresponds with the lift cylinder 11 being fully retracted, and the down most position corresponds with the cylinder being fully extended. The position of the material reduction linkage assembly 2 in a vertical plane is controlled by the lift cylinder 11, and the position of the material reduction linkage assembly in a horizontal plane is controlled by the sweep cylinders 12. In the depicted embodiment the horizontal and vertical positions are independently controlled.

Figure 7A:
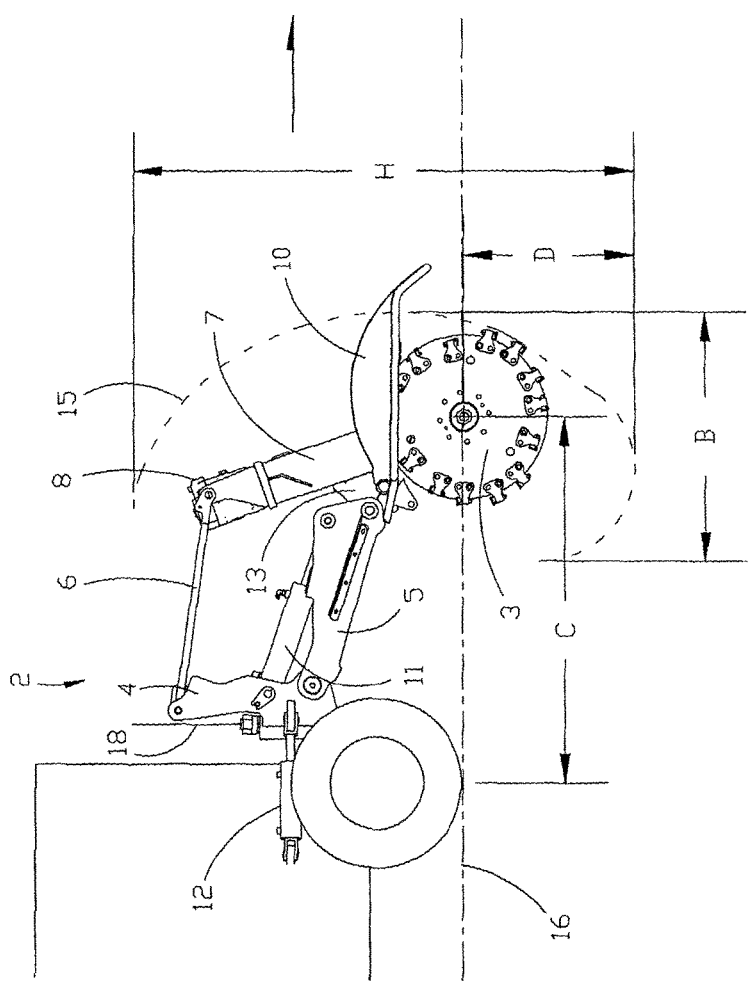
FIG. 7a is a left side view of the machine as in FIG. 1, showing the boom lift cylinder in an intermediate position.
Figure 7B:
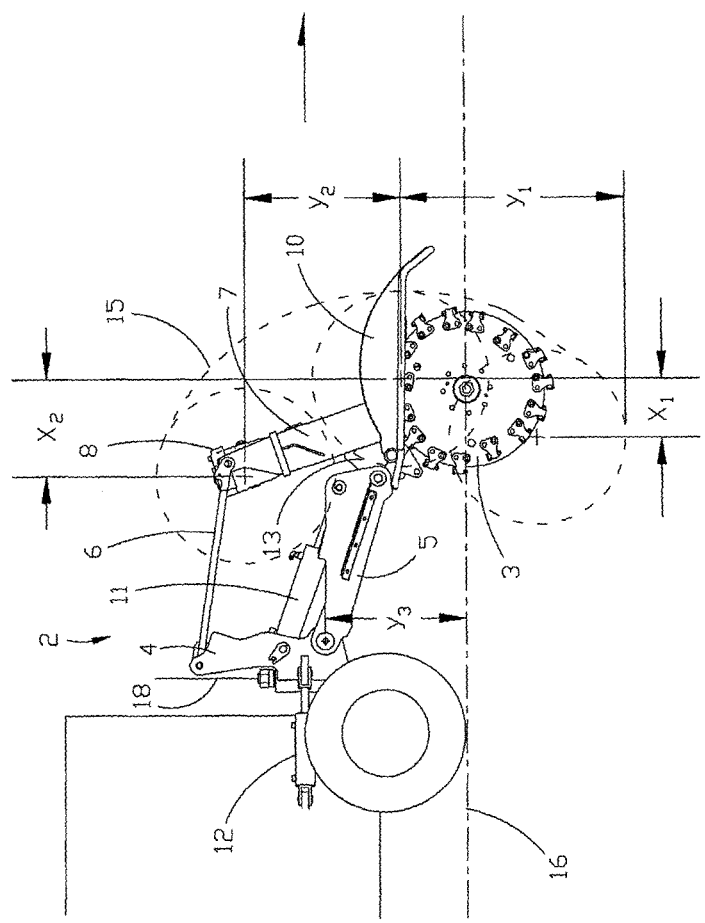
FIG. 7b is a left side view of the machine as in FIG. 1, showing the path of the stump reduction tool.
Figure 8:
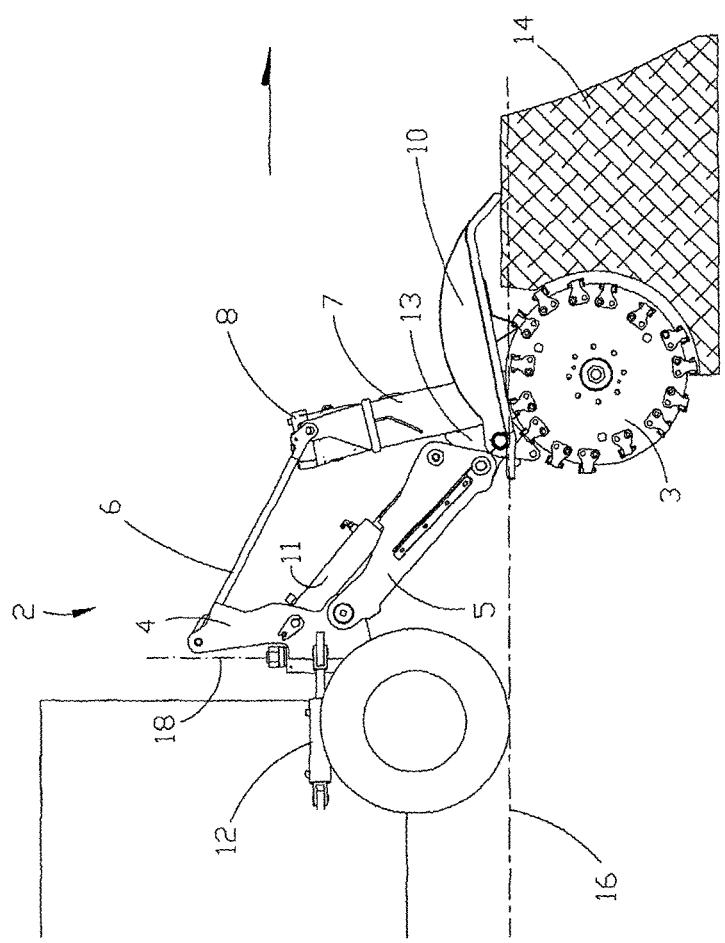
FIG. 8 is a left side view of the stump reducing machine with the guard tilted by a stump during a stump reduction operation.

Still referring to FIGS. 4-8 the angle between a horizontal plane and a line passing through the leading edge 46 and trailing edge 44 of the guard 10 is defined herein as the tilt angle δ. In the depicted embodiment, the variation in the tilt angle δ is less than about 5-35 degrees throughout the range of motion of the material reduction linkage assembly 2, unless it is being deflected (i.e., acted on by an outside force). More preferably, the tilt angle δ is less than about 15 degrees (e.g., between 0 and 15 degrees). This relative low variation in tilt angle δ can be desirable because this enables the guard 10, at least in part, to cover the material reduction tool 3 during operation. Occasionally, the guard 10 is acted on by an outside force during operation, for example, the guard 10 is deflected when the material reduction tool 3 climbs a stump as shown in FIG. 8.

Figure 17:
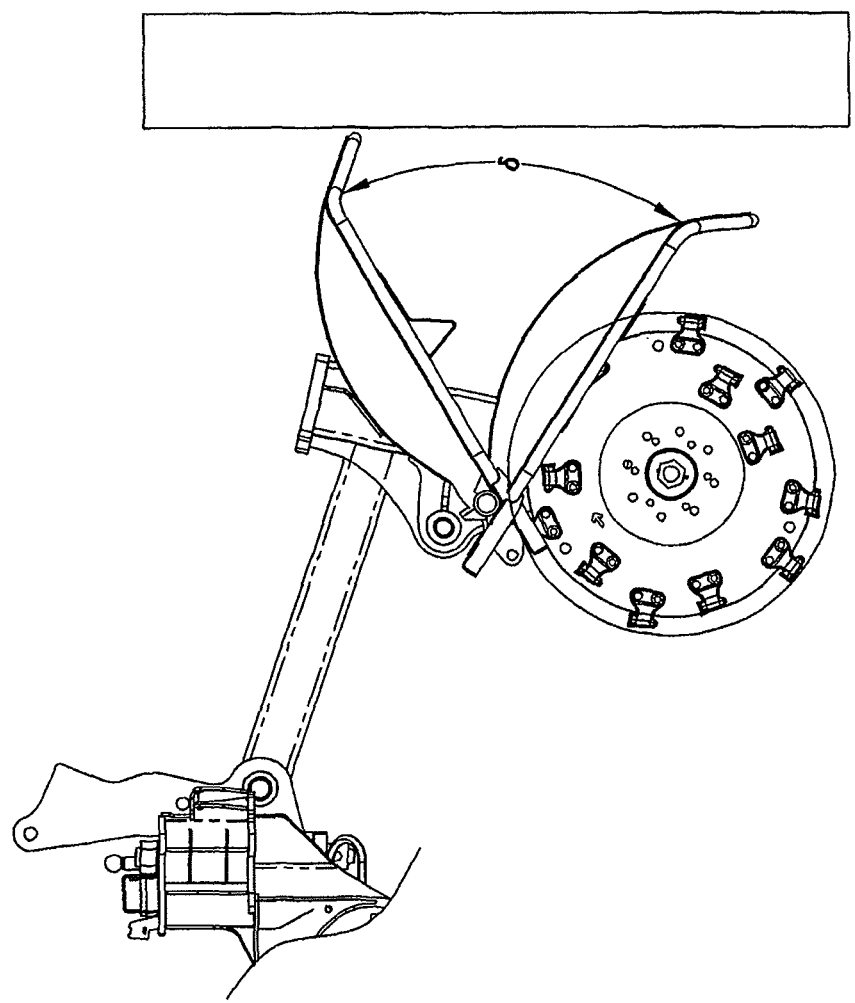
FIG. 17 is side view that illustrates a prior art configuration adjacent a wall.
Figure 18:
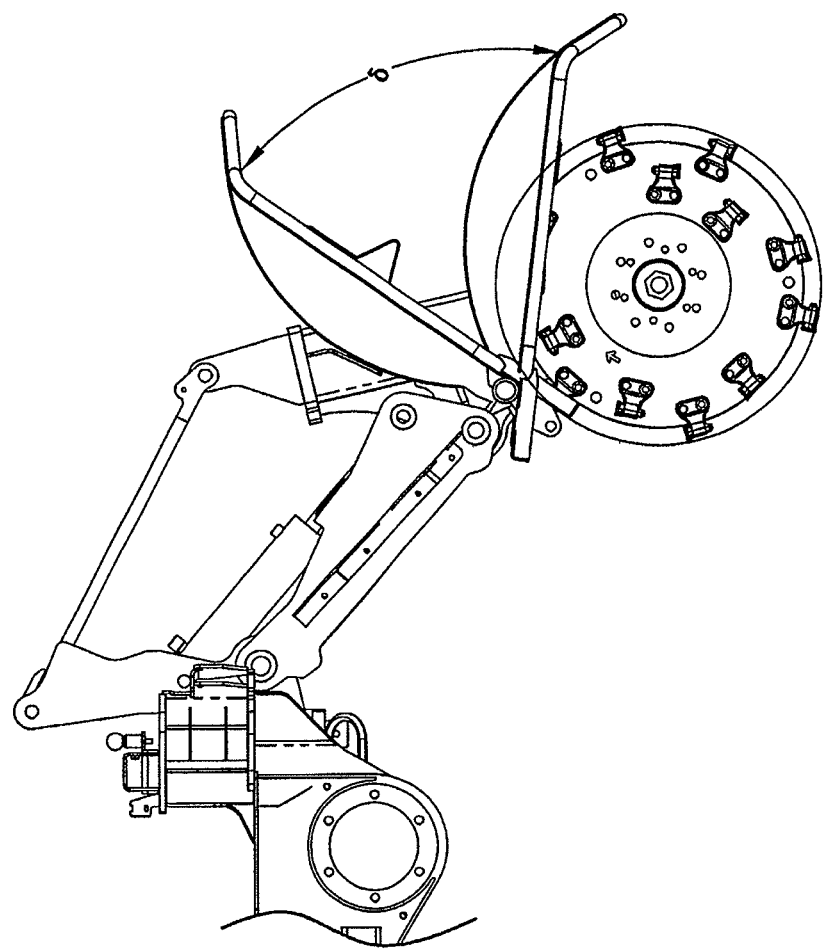
FIG. 18 is a side view that illustrates an embodiment of the present disclosure adjacent a wall.

In the depicted embodiment the guard 10 is configured such that the tilt angle δ can be about 35 degrees greater than the undeflected tilt angle. In some embodiments the deflected tilt angle can be between 5 to 45 degrees relative to the undeflected tilt angle. It should be appreciated that other tilt angles and tilt angle ranges are also possible (e.g., 0-180 degrees). Since according to some embodiments of the present disclosure the variation in undeflected tilt angle is less than in prior art configurations, the stump cutter of the present disclosure is more effective in cutting stumps that are relatively vertical and tall. FIGS. 17 and 18 illustrate that a low variation in tilt angle δ can result in a larger effective range of motion of the guard as compared to a prior art configuration where the tilt angle δ is larger. The configuration illustrated in FIG. 18 is more adept at working near walls or other obstructions than the prior art configuration illustrated in FIG. 17. The range of motion of the guard in the embodiment shown in FIG. 18 is about the same as the range of motion of the guard in the prior art configuration shown in FIG. 17, but due to the lower tilt angle δ of the guard shown in FIG. 18, the stump cutter is more effective in cutting near the obstruction (e.g., a wall).

Referring to FIG. 7a, a full path of the material reduction tool 3 in a vertical plane is shown. In the depicted embodiment the path is consistent and partially dictated by the particular lengths of the linkages, which in the depicted embodiment remains constant during operation. The path includes a component that extends in a vertical direction (up and down relative to the ground surface 16) referenced as H, and a component that extents radially (towards and away from the mount member 4) referenced as B. The depth of the plunge relative to the ground surface 16 is referenced as D, and the radial distance from the pivot axis 18 to the center of the material reduction tool 3 is referenced as C. In one embodiment C is about 51 inches and D is about 23 inches. In the depicted embodiment the distance H is significantly larger than B, meaning that the material reduction tool 3 does not move much radially when it is raised and lowered. In the particular embodiment shown, the value of B is about 35 inches and the value of H is about 69 inches, therefore, the ratio of B:H is about 0.5. In the depicted embodiment the material reduction linkage 2 is configured to achieve the desired ratio. In a prior art system wherein the cutting tool is mounted to an arm that pivots in a vertical plane about a single axis, the arm would need to be substantially longer than the linkage 5 to achieve a radius of curvature that would enable a ratio of B:H to be within the above range. If in the depicted embodiment the length of the second linkage 5 is about X feet long, to achieve the same B:H ratio using an arm that pivots in a vertical plane about a single axis, the arm would need be over 2X feet long. A low B:H ratio can also be desirable because machines with a low B:H ratio are less likely to have their cutting tools inadvertently contact material as they are raised because their cutting tools do not swing as far outwards away from the machines as they are raised.

Figure 19:
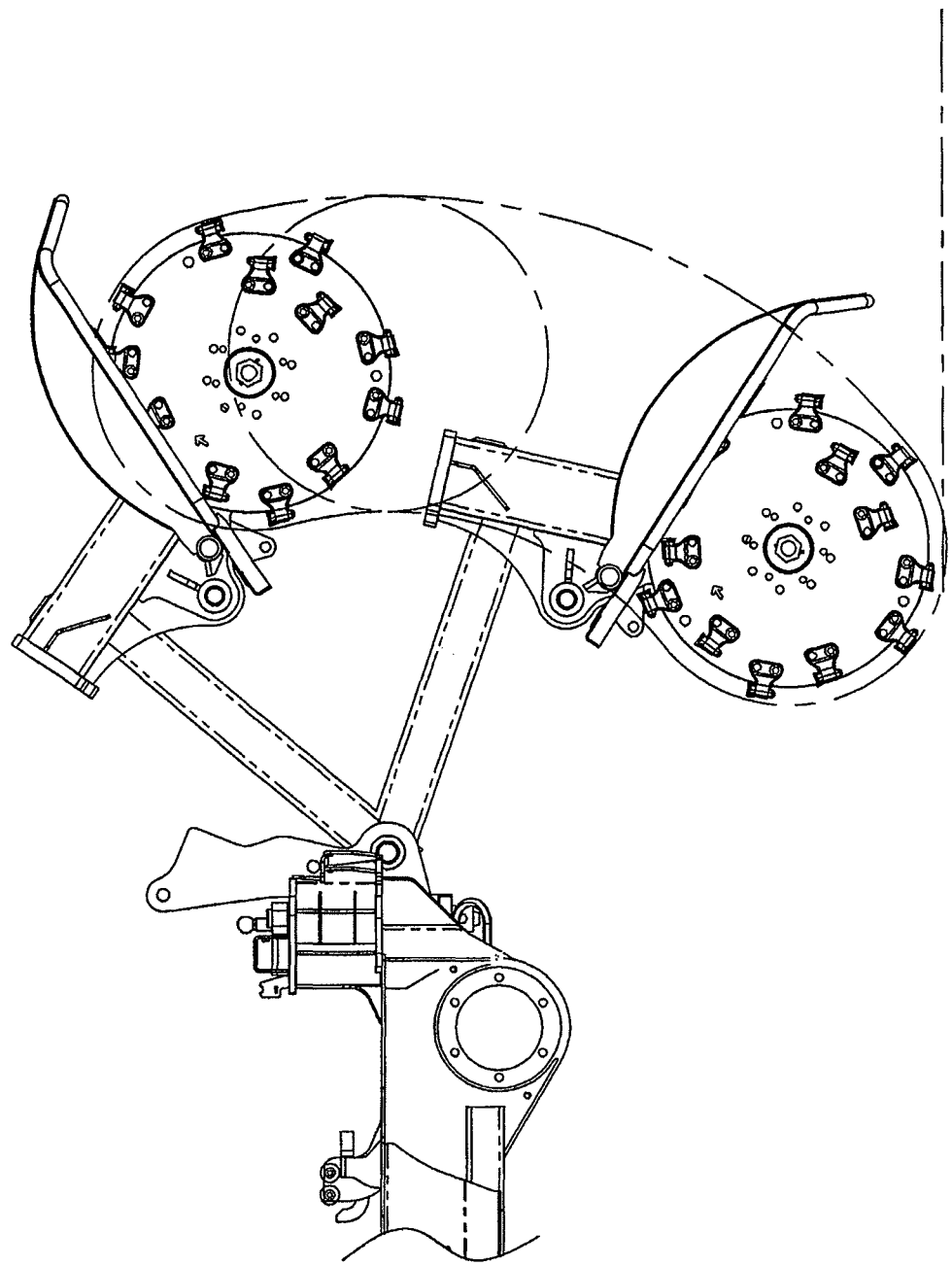
FIG. 19 is a side view that illustrates the path of a cutting wheel of a prior art configuration.

In a prior art configuration with the arm being about X feet long, the radius of curvature is significantly smaller (see FIG. 19). The prior art configuration shown in FIG. 19 is also not able to cut as vertically into the ground as compared to the embodiment of the present disclosure.

Referring to FIG. 7b, the path of the material reduction tool is described in greater detail. The vertical distance from the center (rotational axis) of the material reduction tool 3 at its highest position to the position where the material reduction tool is furthest away from the pivot axis 18 is shown as Y2. The vertical distance from the center (rotational axis) of the material reduction tool 3 at its lowest position to the position where the material reduction tool is furthest away from the pivot axis 18 is shown as Y1. The horizontal displacement that corresponds with the distance Y2 is shown as X2. The horizontal displacement that corresponds with the distance Y1 is shown as X1. The distance from the lower pivot point of the second linkage 4 to the ground surface is shown as Y3. In the depicted embodiment X1 is less than X2 and Y1 is greater than Y2. The depicted configuration allows the material reduction device to move essentially vertically while in operation and retract towards the chassis 30 when in transport. In one embodiment X1 is about 9 inches, X2 is about 14 inches, Y1 is about 33 inches, Y2 is about 23 inches, and Y3 is about 21 inches. In some embodiments the ratio between X1:Y1 is between zero to 0.3 and the ratio between X2:Y2 is about 0.5-0.7. In some embodiments the ratio between X1:X2 is about to 0.5-0.7.

In a prior art configuration with the single pivot arm shown in FIG. 19, the path of the material reduction tool is not as vertical below ground and more vertical above ground as compared to the depicted embodiment of the stump cutter according to the present disclosure. It is typically preferable that the path of the material reduction tool be more vertical below ground and move curved back towards the machine above ground. The ability to move the reduction tool in the substantially vertical direction allows the operator to remove stumps with fewer readjustments to the position of the stump cutter. Furthermore, the ability of the reduction tool to move back (retract) towards the machine when the reduction tool is above ground makes the machine more compact for transport.

Figure 9:
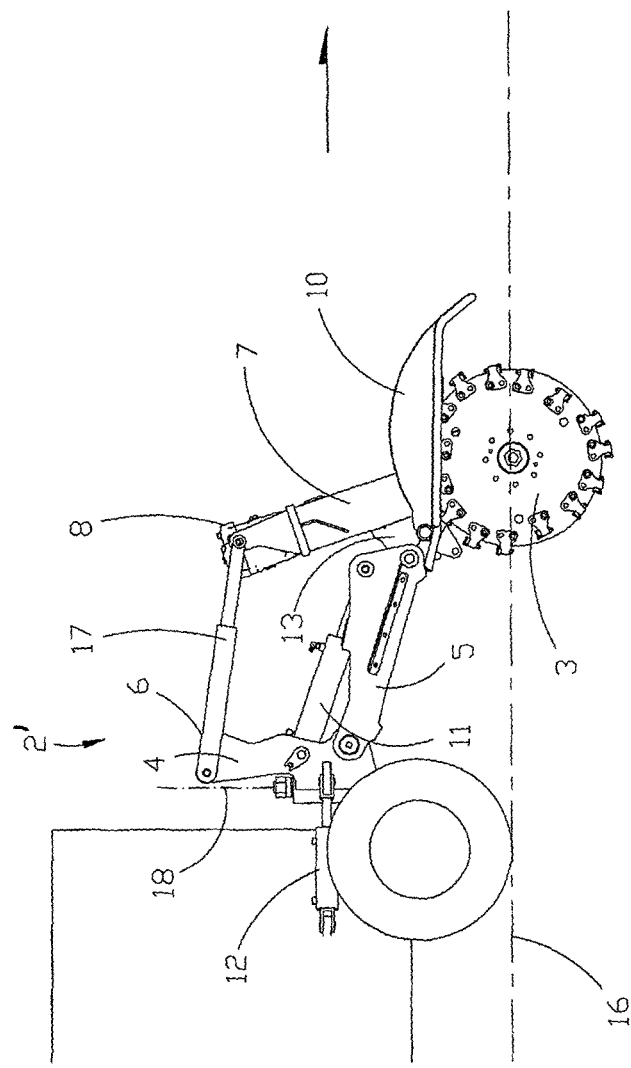
FIG. 9 is a side view of a second embodiment of the stump reducing machine according to the present disclosure.

Referring to FIG. 9, a second embodiment of the material reduction linkage assembly 2' is shown. The alternative embodiment includes a number of the same components described above, which are referenced with the same numbers. In the depicted embodiment the first linkage 6 is shown as a cylinder 17 instead of a fixed length bar as in the first embodiment. In the second embodiment, the cylinder 17 can extend and retract, allowing for the path of the material reduction tool in a vertical plane to be varied. The variable path in the vertical plane can allow the operator to more efficiently remove stumps of various shapes and sizes. The machine according to the second embodiment can enable the operator to cut almost vertically such that the ratio of B:H (more particularly, X1/Y1) is almost zero or alternatively to cut horizontally. The range of B:H in the second embodiment can vary between 0-0.7. This embodiment can be incorporated with a control system that automatically varies the cut path to more efficiently reduce the stumps. The depicted configuration can also have storage and transportation related advantages, as the linkage assemblies can be pulled up and stowed in a compact position on the second end of the material reduction linkage assembly 2', thereby shortening the overall length of the machine.

Figure 10:
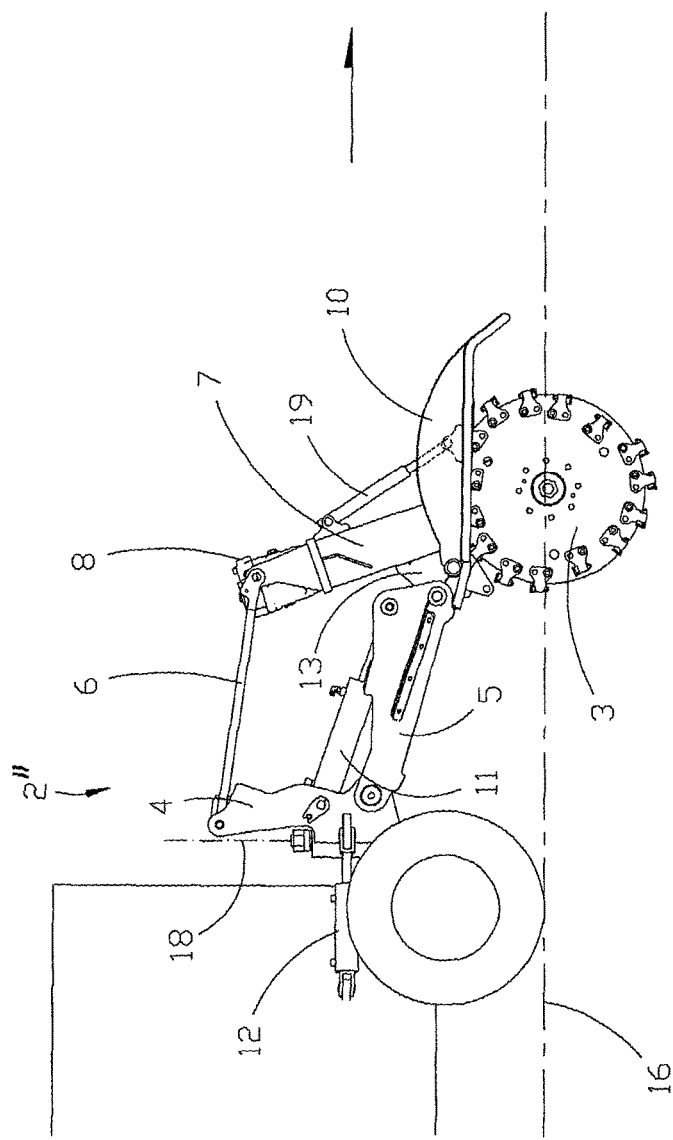
FIG. 10 is a side view of a third embodiment of the stump reducing machine according to the present disclosure.

Referring to FIG. 10, a third embodiment of the material reduction linkage assembly 2" is shown. The alternative embodiment includes a number of the same components described above, which are referenced with the same numbers. The depicted embodiment includes a cylinder 19 that is connected between the guard 10 and the third linkage 7. In the depicted embodiment, the guard can be raised and lowered as desired. The depicted feature can be desirable, as the operator can prevent the guard from jamming into the stump as it climbs. In some embodiments, the cylinder 19 can be configured to allow the guard to float over most objects without operator intervention. For example, cylinder 19 and lift cylinder 11 could have position sensors that detect the amount of cylinder stroke. Based on the amount of stroke at cylinder 11, a controller could regulate the stroke of cylinder 19.

The material reduction linkage assemblies 2, 2', 2" embody several other additional common advantages. Because material reduction tool 3 can be configured to not significantly arc inward toward the machine 1 when the material reduction tool 3 is lowered below grade, it is possible to maintain enough space for the cut chip volume to vacate the cut region, thereby minimizing the power and time that would otherwise be lost due to re-cutting chips. In addition, as sweep occurs, the width swept by the material reduction tool 3 is more constant when measured from the front of the material reduction linkage assembly because the distance C is more constant compared to many prior art machines. The more constant C can be desirable, as it can minimize the need for an operator to re-position the machine to cut roots extending outward from the stump below grade.

The above specification, examples, and data provide a complete description of the manufacture and use of the composition of the invention. Since many embodiments of the invention can be made without departing from the spirit and scope of the invention, the invention resides in the claims hereinafter appended.

Figure 11:
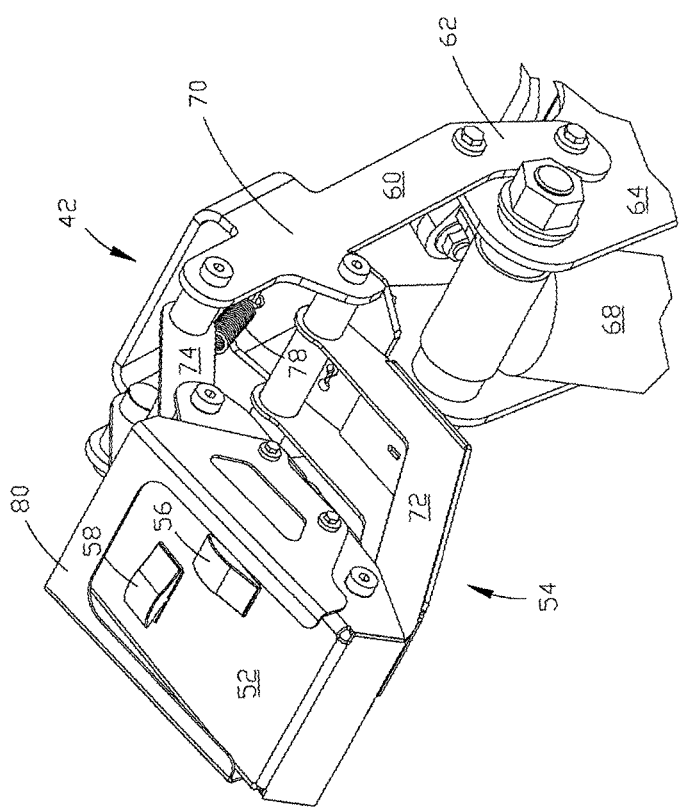
FIG. 11 is an enlarged front side perspective view of the auxiliary controls of FIG. 1a in a working position.
Figure 12:
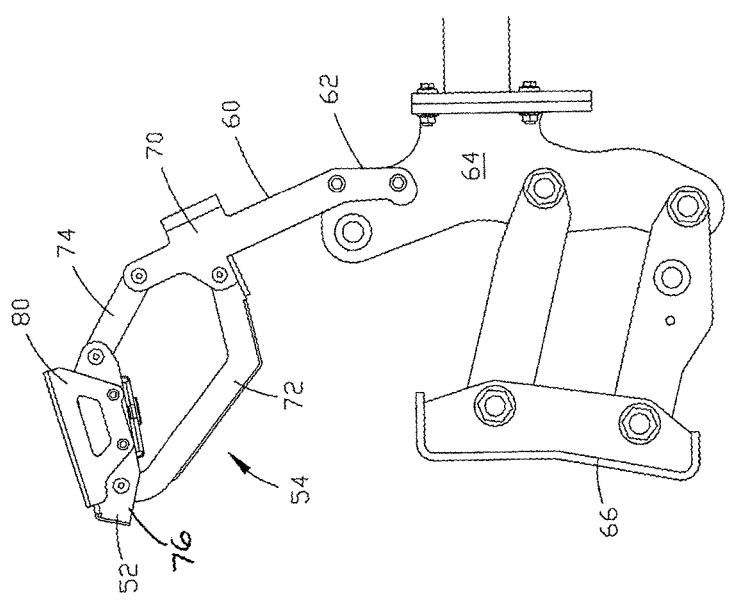
FIG. 12 is a side view of the auxiliary controls of FIG. 1a in a working position.
Figure 15:
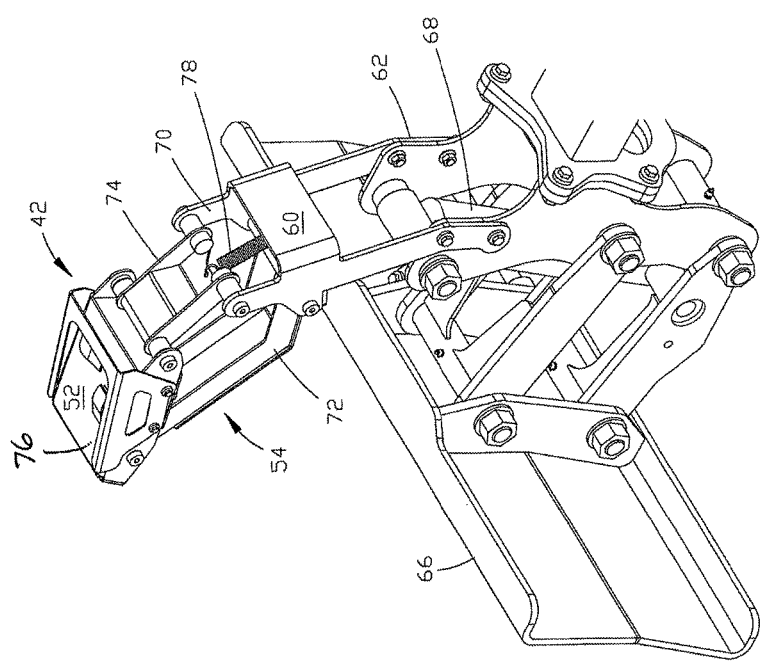
FIG. 15 is a rear side perspective view of the auxiliary controls of FIG. 1a in a working position.
Figure 16:
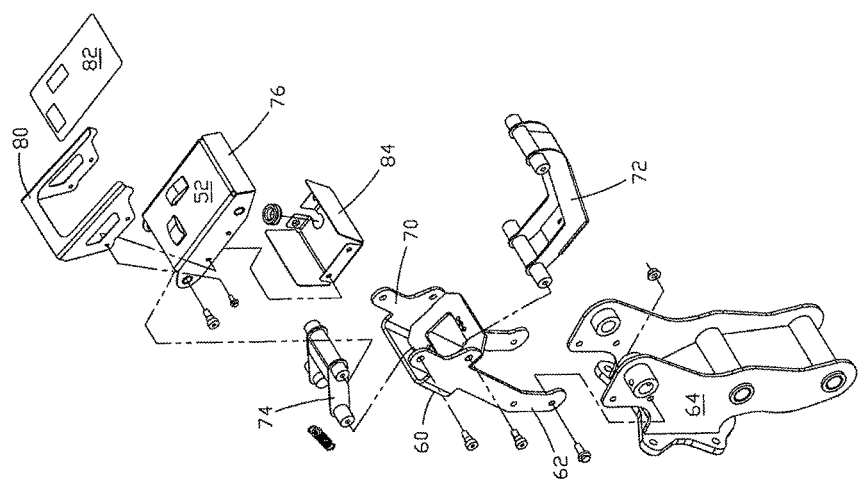

Referring generally to FIGS. 11-16, the secondary set of controls 42 located near the first end 32 of the chassis 30 are described in further detail. In the depicted embodiment, the secondary set of controls 42 includes control panel 52 connected to a linkage assembly 54 that can be pivoted towards the first end 32 into a stowed position (FIGS. 13, 14) or can pivot away from the first end 32 towards the operator for use in the working position (FIGS. 11, 12, 15). In the stowed position, the controls 42 are in a more protected orientation than in the working position. In the stowed position the control panel 52 is faced towards the first end 32 of the machine. The pivoting features also enable easy access to other machine components for service or maintenance, as the controls 42 can be moved out of the way as necessary.

Referring to FIG. 11, in the depicted embodiment the control panel 52 includes a forward and reverse control 56 and a left or right steering control 58, which together enable an operator to change the position of the machine while standing at the first end 32 of the machine. In particular, it enables the operator to walk in line with the machine. This function is particularly advantageous for job sites that require maneuvering the machine through tight and narrow spaces (e.g., a gate). It should be appreciated that in other embodiments the controls on the control panel 52 can include other, or all the, functions available to the main control panel 36. In the depicted embodiment, the controls 42 can be operably connected to the machine via wires or, alternatively, wirelessly.

Figure 13:
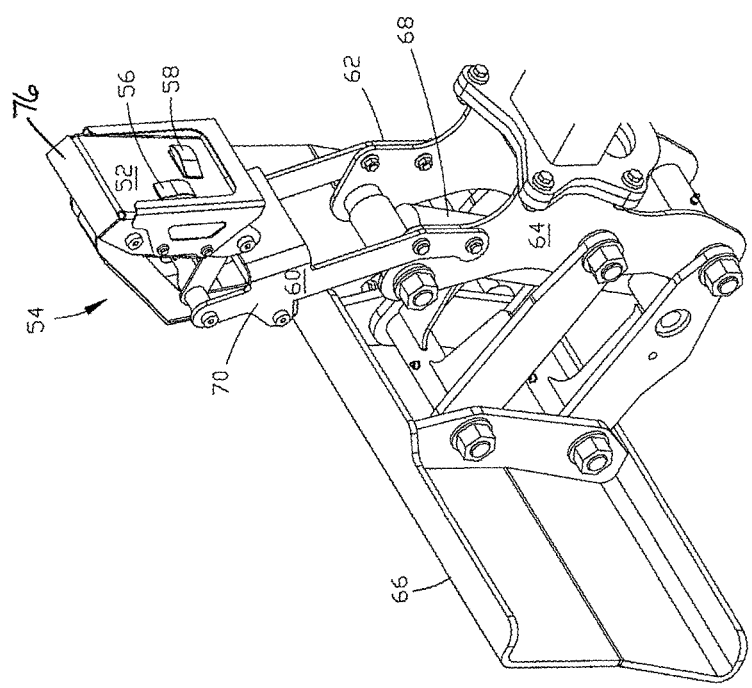
FIG. 13 is a rear side perspective view of the auxiliary controls of FIG. 1a in a stowed position.
Figure 14:
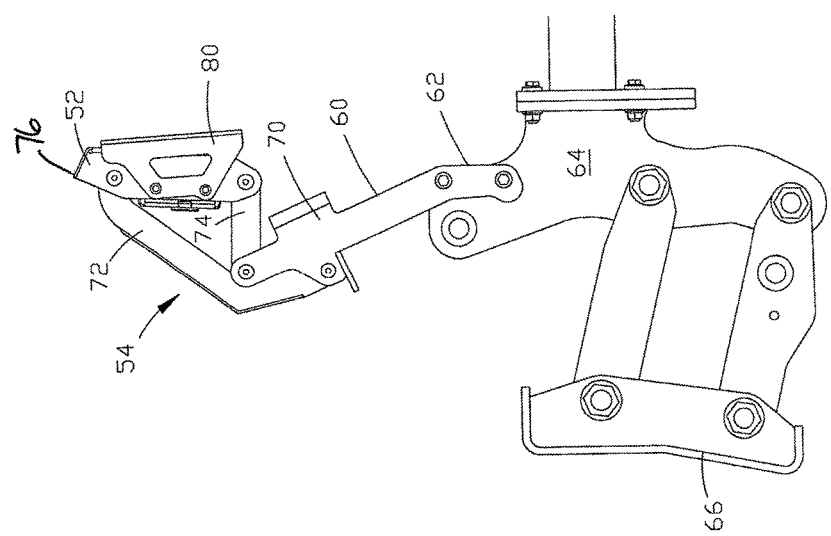
FIG. 14 is a side view of the auxiliary controls of FIG. 1a in a stowed position.

Referring to FIGS. 11-16, in the depicted embodiment the linkage 54 is a four bar type linkage that pivots to an over center position in the stowed position, thereby maintaining the controls 42 in the stowed position until the operator wants to use the controls 42. The over center arrangement of the linkage avoids the need for pins, latches, or other secondary mechanisms for securing the controls 42 in the stowed position. The linkage 54 includes control mount 60. The control mount 60 (also referred to as the first linkage) includes a first lower end 62 that is shown secured to a lower blade mount 64. In the depicted embodiment the blade mount 64 is configured to be bolted to the first end 32 of the machine and is configured to support a blade 66. The blade 66 is configured to be used to push piles of wood chips. In the depicted embodiment the blade is connected to the blade mount 64 such that it can be raised and lowered by extending or retracting a hydraulic cylinder 68 (FIGS. 11, 13, and 15). The control mount 60 includes a second upper end 70 that includes pivot connections for the second linkage 72 and the third linkage 74. In the working position the control panel 52 in the depicted embodiment extends away from the machine to avoid the operator's feet being below the blade 66, which can raise and lower depending on the terrain that is traversed by the stump cutter.

The second linkage 72 includes a first end that pivotally connects to the control mount 60 (i.e., first linkage) and a second end that pivotally connects to the weldment 76 (also known as the fourth linkage). In the depicted embodiment the weldment 76 houses the control panel 52. In the depicted embodiment the weldment is generally vertical in the stowed position and past horizontal in the working position. In the depicted embodiment the change in orientation of the control panel 52 is greater than 90 degrees from the stowed position to the working position. The third linkage 74 includes a first end that pivotally connects to the control mount 60 and a second end that pivotally connects to the weldment 76. In the depicted embodiment, a spring 78 is connected between the control mount 60 and the third linkage 74. Spring 78 acts to keep the control panel 52 in either the working position or the stowed position. The spring 78 and lengths of the linkage are arranged such that the spring is more stretched as it moves out of the stowed position or out of the work position. The spring 78 also prevents the control panel 52 from rattling or flipping open or closed due to vibration as the stump cutter traverses uneven ground surface. Therefore, the linkage is configured so that the control panel 52 will stay in the working position or the stowed position without the need for secondary securing mechanisms (e.g., latches, pins, tethers, etc.)

In the depicted embodiment, the weldment 76 which houses the control panel 52 is protected by a shroud 80, a face plate (or decal) 82, and a bottom plate 84. The shroud 80 and face plate 82 protect the control panel 52 from contact with objects moving towards the first end 32 of the machine when the control panel is in the working position, while the second linkage 72 and the bottom plate 84 protect the control panel 52 from contact with objects. It should be appreciated that many other configurations are also possible.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A stump reducing machine comprising:
   a chassis including a first end and a second end;
   an engine mounted to the chassis;
   a mounting member pivotally connected to the second end of the chassis, the mounting member having a first end and a second end, wherein the mounting member is configured to pivot about a substantially vertical axis;
   a material reduction linkage assembly mounted to the mounting member configured to enable a raising and lowering motion of a material reduction tool that rotates, the material reduction linkage assembly including:
      a first linkage pivotally mounted to the first end of the mounting member, the first linkage being configured to pivot about a substantially horizontal axis;
      a second linkage pivotally mounted to the second end of the mounting member, the second linkage being configured to pivot about a substantially horizontal axis; and
      a third linkage pivotally mounted to the first linkage and the second linkage, the third linkage being configured to support the material reduction tool that rotates;
      wherein lengths of the first linkage, the second linkage, and the third linkage remain constant during operation of the material reduction tool; and
   wherein the material reduction linkage assembly, via the pivotal connection between the second end of the chassis and the mounting member, is configured to laterally sweep through a sweep range relative to the chassis thereby resulting in a sweeping motion of the material reduction tool for laterally engaging a stump.

2. The stump reducing device of claim 1, further comprising a hydraulic motor mounted to the third linkage.

3. The stump reducing device of claim 1, further comprising a guard pivotally mounted to the third linkage, wherein the variation in a tilt angle of the guard during operation is less than 35 degrees.

4. The stump reducing device of claim 1, further comprising a guard pivotally mounted to the third linkage and a hydraulic cylinder connected to the guard.

5. The stump reducing device of claim 1, further comprising a hydraulic cylinder pivotally connected between the mount member and the third linkage.

6. The stump reducing device of claim 1, further comprising a first control console movably mounted to the chassis such that the console can be positioned adjacent the second end of the chassis.

7. The stump reducing device of claim 1, wherein the constant lengths of the first linkage, the second linkage, and the third linkage during operation of the material reduction tool provide a ratio between a horizontal displacement and a vertical displacement of the material reduction tool in a range from 0.4 to 0.6.

8. The stump reducing device of claim 1, wherein the constant lengths of the first linkage, the second linkage, and the third linkage during operation of the material reduction tool provide a ratio between X1:Y1 in a range from 0.0 to 0.3, wherein Y1 is a vertical displacement of the material reduction tool between a lowest position to a position furthest from the mount member, and X1 is a horizontal displacement of the material reduction tool that corresponds with Y1.

9. The stump reducing device of claim 1, wherein the constant lengths of the first linkage, the second linkage, and the third linkage during operation of the material reduction tool provide a ratio between X2:Y2 in a range from 0.5-0.7, wherein Y2 is a vertical displacement of the material reduction tool between a highest position to a position furthest from the mount member, and X2 is a horizontal displacement of the material reduction tool that corresponds with Y2.

10. The stump reducing device of claim 1, wherein the constant lengths of the first linkage, the second linkage, and the third linkage during operation of the material reduction tool provide a ratio between X1:Y1 less than a ratio between X2:Y2, wherein Y1 is a vertical displacement of the material reduction tool between a lowest position to a position furthest from the mount member, X1 is a horizontal displacement of the material reduction tool that corresponds with Y1, Y2 is a vertical displacement of the material reduction tool between a highest position to the position furthest from the mount member, and X2 is a horizontal displacement of the material reduction tool that corresponds with Y2.

11. The stump reducing device of claim 1, wherein the material reduction linkage assembly is configured such that a path of travel of the material reduction tool is more curved above ground than below ground.

12. The stump reducing device of claim 1, wherein the sweep range is between 60 to 90 degrees relative to the chassis.

13. The stump reducing device of claim 1, wherein the sweep range of the material reduction linkage assembly is independent of a vertical position of the material reduction tool.

14. The stump reducing device of claim 1, further comprising a hydraulic cylinder pivotally connected between the mount member and the chassis, the hydraulic cylinder being configured to control a sweeping motion of the material reduction linkage assembly.

15. The stump reducing device of claim 1, wherein a lateral sweep angle and a vertical position of the material reduction tool are configured to be controlled independently.

16. A stump reducing machine comprising:
a chassis including a first end and a second end;
an engine mounted to the chassis;
a mounting member pivotally connected to the second end of the chassis, the mounting member having a first end and a second end, wherein the mounting member is configured to pivot about a substantially vertical axis;
a material reduction linkage assembly mounted to the mounting member configured to enable a raising and lowering motion of a material reduction tool, the material reduction linkage assembly including:
a first linkage pivotally mounted to the first end of the mounting member, the first linkage being configured to pivot about a substantially horizontal axis;
a second linkage pivotally mounted to the second end of the mounting member, the second linkage being configured to pivot about a substantially horizontal axis; and
a third linkage pivotally mounted to the first linkage and the second linkage, the third linkage being configured to support the material reduction tool that rotates;
wherein lengths of the first linkage, the second linkage, and the third linkage remain constant during operation of the material reduction tool;
wherein the material reduction linkage assembly, via the mounting of the material reduction linkage assembly to the mounting member, is configured to laterally sweep through a sweep range relative to the chassis, thereby resulting in a sweeping motion of a material reduction tool for laterally engaging a stump; and
wherein the sweep range of the material reduction linkage assembly is independent of a vertical position of the material reduction tool.

17. A stump reducing machine comprising:
a chassis including a first end and a second end;
an engine mounted to the chassis;
a mounting member pivotally connected to the second end of the chassis, the mounting member having a first end and a second end, wherein the mounting member is configured to pivot about a substantially vertical axis;
sweep cylinders connected between the mount member and the chassis configured to pivot the mount member about the substantially vertical axis;
a material reduction linkage assembly mounted to the mounting member configured to enable a raising and lowering motion of a material reduction tool that rotates, the material reduction linkage assembly including:
a first linkage pivotally mounted to the first end of the mounting member and supported thereon, the first linkage being configured to pivot about a substantially horizontal axis relative to the mount member and configured to pivot about the substantially vertical axis along with the mount member;
a second linkage pivotally mounted to the second end of the mounting member, the second linkage being configured to pivot about a substantially horizontal axis relative to the mount member and configured to pivot about the substantially vertical axis along with the mount member; and
a third linkage pivotally mounted to the first linkage and the second linkage, the third linkage being configured to support the material reduction tool that rotates;
wherein lengths of the first linkage, the second linkage, and the third linkage remain constant during operation of the material reduction tool;
wherein the material reduction linkage assembly, through the mounting thereof to the mounting member, is configured to laterally sweep through a sweep range relative to the chassis as the positioning device pivots the mount member, thereby resulting in a sweeping motion of a material reduction tool for laterally engaging a stump; and
wherein the lateral sweeping motion of the material reduction tool and a raising and lowering motion of the material reduction tool are configured to be controlled independently of one another.

18. The stump reducing machine of claim 1, wherein the raising and lowering of the material reduction tool can occur without any lateral sweeping motion; and with a lateral sweeping motion in either a left-to-right or a right-to-left direction.

19. The stump reducing machine of claim 1, wherein the first linkage is a rigid bar.

* * * * *